US009527039B2

(12) United States Patent
Dale et al.

(10) Patent No.: US 9,527,039 B2
(45) Date of Patent: Dec. 27, 2016

(54) FILTER ARRANGEMENT

(75) Inventors: Jason Dale, Chester (GB); Aage Bjorn Andersen, Raelingen (NO)

(73) Assignee: MOSS HYDRO AS, Drammen (NO)

(*) Notice: Subject to any disclaimer, the term of this patent is extended or adjusted under 35 U.S.C. 154(b) by 307 days.

(21) Appl. No.: 14/116,093

(22) PCT Filed: May 8, 2012

(86) PCT No.: PCT/GB2012/050998
§ 371 (c)(1),
(2), (4) Date: Feb. 12, 2014

(87) PCT Pub. No.: WO2012/153117
PCT Pub. Date: Nov. 15, 2012

(65) Prior Publication Data
US 2014/0158617 A1 Jun. 12, 2014

(30) Foreign Application Priority Data

May 6, 2011 (GB) .................................. 1107563.7

(51) Int. Cl.
*B01D 65/02* (2006.01)
*B01D 29/52* (2006.01)
(Continued)

(52) U.S. Cl.
CPC ............. *B01D 65/02* (2013.01); *B01D 29/117* (2013.01); *B01D 29/52* (2013.01); *B01D 29/6453* (2013.01); *B01D 63/06* (2013.01)

(58) Field of Classification Search
CPC ............. B08B 9/00; B08B 9/02; B08B 9/027; B08B 9/04; B08B 9/0436; B08B 9/045; B08B 9/049; B08B 9/0492; B08B 2209/00; B08B 2209/02; B08B 2209/027; B08B 2209/04; B01D 2201/082; B01D 33/503; B01D 46/0065; B01D 46/04; B01D 33/00; B01D 33/44; B01D 33/46; B01D 33/48; B01D 33/76; B01D 33/766; B01D 2321/00; B01D 2321/04; B01D 2321/12
(Continued)

(56) References Cited

U.S. PATENT DOCUMENTS 3,357,566 A * 12/1967 Schmid .............. B01D 29/0054
210/333.01
3,743,099 A * 7/1973 Holz ......................... B07B 1/00
210/333.01
(Continued)

FOREIGN PATENT DOCUMENTS

DE 3309787 A1 9/1984
DE 102009012444 A1 9/2010
(Continued)

OTHER PUBLICATIONS

Machine translation of EP 0120988 B1.*
International preliminary report on patentability dated Nov. 12, 2013 for PCT Application No. PCT/GB2012/050998.

*Primary Examiner* — Allison Fitzsimmons
(74) *Attorney, Agent, or Firm* — Wilson Sonsini Goodrich & Rosati

(57) ABSTRACT

The present invention relates to a filter arrangement comprising a plurality of elongate hollow filtration elements, each containing a back-washing mechanism. The back-washing mechanisms comprise at least one debris receiving portion having a cross-section corresponding to the cross-section of the hollow filtration element.

24 Claims, 11 Drawing Sheets

(51) Int. Cl.
*B01D 29/11* (2006.01)
*B01D 29/64* (2006.01)
*B01D 63/06* (2006.01)

(58) Field of Classification Search
USPC .................. 210/637, 638, 767, 768, 791,
321.72,210/321.73, 321.78, 323.1, 323.2,
324, 348,210/346, 332, 333.01, 347, 357,
460, 461, 483,210/484, 486
See application file for complete search history.

(56) References Cited

U.S. PATENT DOCUMENTS

| | | | | |
|---|---|---|---|---|
| 3,994,810 A | | 11/1976 | Schaeffer | |
| 4,650,572 A | * | 3/1987 | Hayes | B01D 35/14 210/131 |
| 5,152,891 A | * | 10/1992 | Netkowicz | B01D 29/23 209/250 |
| 5,275,728 A | * | 1/1994 | Koller | B01D 29/117 210/333.1 |
| 5,356,532 A | * | 10/1994 | Wilkins | B01D 33/067 210/107 |
| 2011/0226681 A1 | * | 9/2011 | Lee | C02F 1/325 210/90 |
| 2014/0238911 A1 | * | 8/2014 | Lee | B01D 35/00 210/108 |

FOREIGN PATENT DOCUMENTS

| | | | | |
|---|---|---|---|---|
| EP | 0120988 B1 | * | 5/1987 | ............ B01D 29/23 |
| EP | 1683584 B1 | | 10/2009 | |

\* cited by examiner

FILTER ARRANGEMENT

FIELD OF THE INVENTION

The present invention relates to a filter arrangement and a filter arrangement comprising a back-washing mechanism. The arrangement according to the invention provides an efficient and scalable filter with minimal pressure and process fluid loss. The filter arrangement is particularly, but not exclusively, suitable for use in high volume application such as potable water production including recirculation of water from domestic and industrial processes, cooling-water intake for power plants, produced water from oil/gas exploration, in ballast water and aquaculture management or other applications involving fluids other than water.

BACKGROUND

The management of water represents a wide application area and is receiving considerable attention both due to its limited availability in certain parts of the world as well as to its potential as a source of the spreading of disease as well as of the spreading of unwanted organisms from one region to another. Filtration or more specifically, microfiltration can be considered a preparatory step in treatment processes aiming to improve water quality and to reduce risks associated with water containing unwanted elements. Improved filtration technologies may benefit currently applied treatment methods regardless of media and applications and further open up for the development of improved processes and technologies Treatment and filtration of ship ballast water is of increasing importance to fleet operators. Transferring large volumes of sea water is known to be damaging to marine biodiversity. The scale of modern ships means the volumes of ballast water tanks is large and consequently the time taken to load and unload ballast tanks is of commercial importance to fleet operators. Additionally, on-board ships space is surprisingly scarce and efficient filtration systems or more specifically micro-filtration systems capable of filtering large volumes of water and removing a considerable amount of matter (organic as well as in-organic) will open up for improved treatment performance and the reduction of the footprint of treatment systems.

The inventors have established that the need for efficient filtration or micro-filtration systems capable of filtering large volumes of fluids such as sea water in small periods of time can be achieved using the invention disclosure herein.

A range of filter systems are available to filter sea water in these applications. Such systems generally comprise a conventional filter element through which the sea water for example flows.

As the liquid flow passes through the wall of the filters elements any dirt, particles or organic matter greater in size than the filter size specification may not pass through the filter element and are trapped on the internal wall of the filter element and begin to form debris, known as a 'cake', of filtered matter. As the cake of matter begins to build, the pressure loss over the filter element increases thereby requiring the cake to be cleaned off the interior wall of the filter element if efficiency is to be maintained.

This cleaning process can be achieved by stripping down the filter or through a backwashing mechanism which may be configured for continuous cleaning or triggered only when the pressure loss reaches a certain monitored level or triggered at present intervals or manually. The backwashing mechanism may also make use of a collection chamber underneath the filter elements where the cake of matter from the filter element can be collected and then evacuated by a suitable evacuation pipe.

Various back-washing mechanisms have been employed which allow the filter element to be cleaned through reverse water flow through the filter wall. The back-washing can be performed whilst the filter is in use thus allowing the filter to continuously filter water whilst being cleaned.

The present application describes an unconventional filter arrangement and additionally a back-washing mechanism which advantageously provides a highly efficient filter capable of large volume filtering with minimal pressure drop and process liquid flow.

INVENTION SUMMARY

According to an aspect of the invention there is provided a filter arrangement comprising a chamber and a plurality of elongate hollow filtration elements contained therein, each element comprising a semi-permeable filtration wall and an internally located back-washing mechanism; wherein each back-washing mechanism comprises at least one debris receiving portion having a cross-section corresponding to the cross-section of the hollow filtration element such that the outer perimeter of the debris receiving portion is located immediately adjacent to the inner periphery of the filtration wall of the hollow element.

The filter arrangement according to the present invention provides a back-washing mechanism which efficiently and effectively removes debris from the filtration wall of each of the plurality of filter elements. The close alignment of the debris receiving portions with the inner wall of each filtration element around its entire periphery results in a uniform back-wash operation of the filtration wall. The filtration element can be back-washed rapidly whilst allowing the normal operation of the filter arrangement to continue i.e. the back-washing can take place during normal filtration.

According to the present invention the pressure loss through the filter compared with prior art is reduced. Additionally, the method of cleaning of the filter is also improved. These improvements provided by the present invention allow for the reduction in filter mesh sizes without reducing the flow-rate or capacity of a given filter arrangement. Thus, the merit represented by enabling liquid to be delivered to a (high capacity) treatment process which is considerably "cleaner" because of finer filtration will reduce the burden on the treatment process opening for it to be scaled down (e.g. reducing the concentration of "conditioning" chemicals or opening up for introducing alternative treatment processes.

Thus, the present invention provides a high efficiency in-line backwashing filter comprising multiple filter elements, a low pressure head requirement, minimal pressure and process liquid/fluid loss and a manual or automatic self-cleaning filter screen (back-washing) operation.

The filter arrangement according to the present invention is advantageously scalable up to very high capacities from less than 100 $m^3$/hr to above 10,000 $m^3$/hr by adjusting the number of filter elements and the diameter and length of the filter elements. Furthermore, the arrangement can be installed in a horizontal or vertical orientation or any orientation in-between and requires minimal disruption to process pipework.

The speed with which the filter arrangement can be back-washed reduces the volume of process fluid/liquid (that is liquid passing through the filter arrangement) which must be diverted to the debris outlet. This further enhances overall performance of the filter arrangement.

There is provided a filter arrangement in which the filter elements provide physical separation and removal of substances such as organic and inorganic particles above a certain size. The filter elements may be constructed by, but not limited to, the metal weave-wire sintered screen method where multiple metal screen layers are sintered together with supporting structures to create a strong filter element that is able to support its own weight. At each end of the filter elements a metal or plastic ring in combination with an internal or external O-ring serves as a suitable method of sealing the ends of the filter element.

Alternatively, other types of filter element design may be incorporated that under the operating conditions of the filter are permeable to one or more selected components of the liquid mixture, solution or suspension under treatment and is impermeable to the remaining components. Such filter elements may be constructed from, but not limited to, natural or processed fibre, man-made organic or synthetic materials, ferrous and non-ferrous metals, glass, activated or natural carbon, ceramics, papers and plastics. Such filter element designs may be constructed from, but not limited to, sheet or woven materials, non-woven materials, pleated meltspun materials, inorganic bonded porous media, mineral wools, glass fibre, carbon fibre, woven wire and screens, sintered wire mesh, perforated plate, wedge wire and membrane type of designs or any combination thereof.

The filter size specification is determined according to the liquid and particle properties to be filtered. Thus, the filter size (that is the size of the holes or flow paths through the filter) may be any suitable size depending on the desired application. For example the permeability of the filter elements may be selected to be <1, 1, 10, 20, 40 or 50 microns or greater depending on the selecting application.

As an additional benefit, the filter element may advantageously be coated with a suitable compound to provide increased corrosion resistance or improved surface qualities. For example, coatings prepared from e.g. $T_iO_2$ or Polyaniline-nano-$T_iO_2$ particles synthesized by in-situ polymerization have excellent corrosion resistance in aggressive environments. The individual filter elements may therefore be coated to improve corrosion resistance. In addition the nano-surface achieved can provide improved surface qualities making the surface very slippery and difficult for matter to 'stick' to the surface thereby requiring less frequent cleaning.

The filtration elements may have any cross-sectional shape or profile depending on the application. The application may for example define the space (the envelope) in which the arrangement may be located. The debris receiving portions advantageously have a cross-sectional shape or profile corresponding closely to the shape of the selected filtration element so as to allow for close alignment of the outer edge or periphery of the debris receiving portion and the inner surface of the filtration element. More specifically the alignment between the debris receiving portion and the filtration element is around the entire circumference of the inner surface of the filtration element.

The separation distance between the debris receiving portion and the filtration wall is selected so as to allow movement of the debris receiving portion along the length of the element whilst allowing debris to be drawn into the debris receiving portion as described further below.

Although any suitable shape may be used for the filtration element and debris receiving portion, the filtration element and debris receiving portions may both advantageously be provided with circular cross-sections. In such an arrangement the debris receiving portions may be in the form of discs and the filtration elements in the form of hollow cylinders into which the discs can be located.

The filtration elements are advantageously arranged such that an open end is provided facing an inlet to the filter assembly. Thus, each filtration element may comprise a first open end arranged to receive fluid from an inlet to the filter assembly and a second closed end, such that fluid entering the filtration element is directed through the semi-permeable filtration wall. According to this arrangement each filtration element receives an equal portion of the fluid entering the filter assembly which is then directed through the filtration wall by virtue of the closed opposing end of each element.

Advantageously each element may additionally be provided with an internally located backwashing mechanism within the hollow portion of the element. The back-washing mechanism is advantageously adapted to allow movement of the debris receiving portions(s) along at least part of the length of the respective filtration element.

Thus, the debris receiving portion is able to be conveyed over the inner surface of the element such that debris can be collected from all parts of the filtration wall. Thus, the entire surface of the wall can be cleaned of debris. The debris receiving portion extends around a full 360 degrees of rotation (with respect to the hollow element) thus meaning that there is no requirement for the debris receiving portion to be rotated with respect to the filtration element. Linear movement is all that is required to cover the entire inner surface of the filtration element.

The debris receiving portions may be moved and supported using any suitable means and structure. For example, the debris receiving portion(s) may be arranged on a hollow shaft or tube coaxially located with respect to the filtration element and movable along the elongate axis thereof.

In order to move the back-washing mechanism the assembly may be provided with a drive mechanism arranged to linearly and reciprocally move the back-washing mechanism along the axis of the filtration element. Movement may be by means of a linear actuator such as a piston or other electro-mechanical, pneumatic or hydraulic arrangement.

These multiple backwashing mechanisms are mounted with alignment to the centre line of each filter element and can be driven independently of each other or simultaneously or as a sub-group, for example in pairs. Thus, the filter assembly can be back-washed in the most effective manner with minimal detrimental influence on process fluid flow within the arrangement.

A plurality of debris receiving portions may be equally spaced along the length of the element and separated by a predetermined distance. Advantageously, in order to ensure uniform collection of debris from the filtration element wall the back-washing mechanism is arranged to move reciprocally along the length of the filtration element by a distance, in each opposing direction, equal to half of the axial spacing of adjacent debris receiving portions.

The back-washing mechanism need only be reciprocated by an amount equal to half of the separation of adjacent debris receiving portions because of the 360 degree extent of the debris receiving portion around the circumference of the element.

Debris may be received into an open channel extending around the debris receiving portion i.e. a continuous open 'slot' or channel into which debris can be drawn. Alternatively a plurality of orifices or holes may provide a path from the outer surface of the debris receiving portion to an internal channel of the debris receiving portion. In effect the outer perimeter of the debris receiving portion may be perforated itself.

In such an arrangement the track or support on which the debris receiving portions move linearly may additionally be provided with a modified path on an outward or return stroke to rotate the debris receiving portion to ensure that the entire surface of the filter element wall is cleaned. It will be recognised that the rotation need only account for the distances between adjacent holes on the debris receiving portion and not be a continuous rotational operation.

This advantageously minimises the distance of travel for the back-washing mechanism thereby reducing the time required to back-wash the filter element, reducing the volume of process liquid needed to back-wash the filter elements and consequently maximising the throughput of the filter assembly.

The debris receiving portions are advantageously adapted so as to receive debris from the filtration element wall on application of a reverse flow through the filtration wall. In effect the debris receiving portion acts as a debris 'trap' or collection channel arranged to collect debris leaving the filtration wall. Thus, the plurality of debris receiving portions may advantageously comprise a peripherally extending channel or recess arranged to receive debris from the filtration wall. The channel may advantageously be provided with one or more conduits arranged to communicate debris from the respective channel to a debris outlet of the filter arrangement.

Thus, debris received into the channel can be communicated away and out of the filter arrangement to a debris outlet or discharge port. The conduit connecting the channels of each debris receiving portion may conveniently be connected to a common conduit passing along the axis of the back-washing mechanism. This may for example be defined by the hollow tube supporting the debris receiving portions. Thus, the debris can be communicated away from the filtration wall to a common conduit or rail and to the debris outlet.

It will be recognised that the invention also extends to gas filtration arrangements. For example the invention may be used to filter solid particles from a gas stream. In such an arrangement a paper filter may be used for example.

The debris is removed from the filtration element wall by means of a back or reverse flow of process fluid. This is achieved by a differential pressure across the filtration wall. In normal operation the pressure on the inside of the hollow filtration element is greater than that on the outside thereby creating a forward flow of fluid. By reversing the pressure differential between the channel and the chamber of the filter arrangement a localised (isolated) reverse or back-flow of process fluid can be achieved causing debris to be removed from the filtration wall.

The pressure differential may be achieved in any suitable way. Advantageously however the differential may be achieved by reducing the pressure in the conduits communicating with the debris receiving channel. This consequently reduces the pressure in the channel of the debris receiving portion and causes debris to move into the channel.

The difference between atmospheric pressure and the pressure with in the chamber of the filter arrangement may be sufficient to achieve the back flow and in such an arrangement a control valve may be provided to selectively open and close the debris outlet thereby creating the reverse flow.

Additionally, or alternatively, a vacuum or suction apparatus may be provided to increase the back-flow pressure to enhance the back-wash or cleaning operation. In such an arrangement a vacuum apparatus may be coupled to the debris outlet or to the debris receiving conduit forming the back-wash mechanism.

The back-washing mechanism may advantageously support a plurality of debris receiving portions using any suitable structure as discussed above. The structure may for example be a centrally extending hollow tube or shaft comprising a plurality or radially extending support arms or 'spokes' coupling the shaft to a plurality of circumferentially extending discs or rings. The discs or rings in turn may comprise the debris receiving channel as described above.

The conduit for communicating debris from the channel to the debris outlet may then conveniently be formed within the support arms or spokes and hollow tube thereby defining an integrated back-wash support structure and debris removal conduit.

The chamber housing the filtration elements may be any suitable shape depending on the application and the envelope into which the assembly is to be installed.

Advantageously the chamber of the present invention may be generally cylindrical in cross-section and the plurality of hollow filtration elements arranged parallel to the elongate axis of the cylindrical chamber. Advantageously the filtration elements may also be cylindrical.

The inlet for process fluid and outlet for filtered process fluid to the filter arrangement described above may be coupled to the chamber using conventional piping configurations.

Unconventionally however the inlet for process fluid and outlet for filtered fluid may advantageously be arranged so as to be coaxial with each other and be parallel with the axes of the chamber and filtration elements. Such an arrangement allows the filter arrangement to be installed in process pipework 'in-line' i.e. in co-axial with process-pipework. This negates the conventional 90 degree angle changes in direction for process fluid entering and leaving the filter arrangement which are conventionally used for filter arrangements and specifically for ballast water filter arrangements.

Advantageously in such an arrangement process fluid leaving the filter arrangement is in-line with the process fluid which had entered the filter arrangement. Advantageously changes in direction necessary to effect filtration of the process fluid take place within the filter arrangement chamber only. It has been established that according to such an arrangement pressure drop and required pressure head to operate the filter can be surprisingly and advantageously reduced.

The plurality of filtration elements may be arranged in any suitable configuration within the chamber. According to the invention the plurality of hollow filtration elements may be equally spaced within and around the periphery of the chamber i.e. radially and circumferentially spaced with respect to the common axis of the inlet and outlets to the filter arrangement.

Thus, a ring of filter elements is provided around the perimeter of the inner surface of the chamber unconventionally leaving a centrally located space in the centre of the chamber. Advantageously, the centrally located space acts to receive filtered process fluid from the outer surfaces of the filtration elements and is further fluidly connected to the outlet of the arrangement. A convenient flow path is thereby created through the filter arrangement between the inlet to the arrangement and the collection chamber.

The diameter of the chamber of the filter arrangement may advantageously be selected so as to be greater than the diameter of the filter arrangement inlet thus increasing the number of filter elements contained within the chamber. The assembly may further comprise a divergent portion diverging from the diameter of the inlet to the diameter of the chamber and arranged to communicate fluid therebetween.

Thus, at the upstream end of the in-line filter arrangement, an inlet pipe may be connected to the cylindrical filter housing or chamber by a diverging pipe section that serves to gently reduce the speed of the incoming liquid fluid flow in order to minimise pressure loss and reduce the inlet pipe diameter.

Within this diverging pipe section a suitable fluid flow guide or baffle may be located in order to divide the incoming liquid fluid flow and direct an equal amount of the incoming liquid fluid flow towards the open end of each filtration element with minimal pressure loss. This guide may be specially shaped or it can be a simple shape such as a half sphere shape or a cone shape depending on the level of pressure loss that can be tolerated. Additional baffles may also present to condition and straighten the incoming liquid fluid flow.

A sealing plate may additionally be provided to prevent direct flow of fluid through the filter arrangement i.e. to direct fluid flow through the filter elements.

The outlet of the filter arrangement may similarly be arranged so as to comprise a diverging portion between the outlet and the centrally located space within the chamber as described above. Thus, by gently slowing the fluid the pressure at the outlet can be recovered thereby minimising the effect of the filter arrangement within the system.

The plurality of peripherally located filtration elements can be seen to define the centrally located space within the chamber as described above. The radius of the centrally located space can be defined as the distance measured radially from the central axis of the filter arrangement to the surface of the one of the peripherally located filtration elements. Advantageously the radius of the centrally located space may be selected so as to be less than the radius of an outlet of said filter arrangement. The pressure loss across the filter can thereby be minimised.

In use, the incoming fluid flow is advantageously directed in equal amounts towards the interior of each individual filter element with minimal pressure loss. The process fluid flow then enters the interior of each of the individual filter elements and begins to pass through the filtering surface of each individual filter element. Once the fluid flow has passed through the filtering surface of each individual filter element it re-joins the main bulk of filtered fluid in the centrally located space described above and is directed towards the downstream end of the in-line filter arrangement. At the downstream end of the in-line filter arrangement an outlet pipe is connected to the cylindrical filter housing by a second diverging pipe section as described above that serves to gently reduce the speed of the outgoing fluid flow in order to minimise the pressure loss and increase the outlet pipe diameter before continuing into the process line.

Viewed from another aspect there is provided a method of back-washing a filter arrangement, said filter arrangement comprising a chamber and a plurality of elongate hollow filtration elements contained therein, each element comprising a semi-permeable filtration wall and an internally located back-washing mechanism;

wherein each back-washing mechanism comprises at least one debris receiving portion having a cross-section corresponding to the cross-section of the hollow filtration element such that the outer perimeter of the debris receiving portion is located immediately adjacent to the inner periphery of the filtration wall of the element, said method comprising the steps of: (A) creating a pressure differential between the chamber and a debris receiving portion such that fluid is caused to flow in a reverse direction through the filtration wall; and (B) moving the debris receiving portion(s) relative to the filtration wall so as to remove debris from the filtration wall.

Thus, according to such an aspect there is provided a method of efficiently and effectively back-washing a filter arrangement.

As described above the filter assembly additionally provides an in-line filter arrangement causing minimal pressure loss in process pipework.

Aspects of the invention extend to a water treatment system comprising a filter arrangement described herein and similarly to a ballast water treatment system comprising a filter arrangement described herein.

More specifically the filter arrangement may be applied in order to separate organic and non-organic matter and consequently the effects of such in any liquids, including but not limited to fresh water applications, produced water treatment applications, sea water applications, waste water applications and aquaculture applications on land or on floating units such as floating aquaculture installations (fish farms), installations associated with the production of oil and gas as well as on-board ships (for example in conjunction with ballast water management).

The filter may also be effectively applied to industrial areas such as food and drink processing, mineral and slurry processing, pharmaceutical processing, chemical processing and power generation applications such as pre-processing of power station cooling water or processing of electrical transformer oils and is not limited to water based liquids alone but could also be used to treat acids and alkalis.

It will be recognised that the features of the aspects of the invention(s) described herein can conveniently and interchangeably be used in any suitable combination.

BRIEF DESCRIPTION OF THE FIGURES

Embodiments of the invention will now be described by way of example only with reference to the accompanying drawings in which.

Figure 1B:
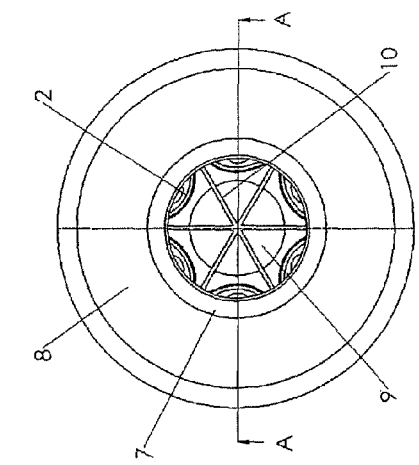
FIGS. 1A & 1B illustrate an in-line filter installation between two horizontal pipes in cross-section and end view respectively.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention.

DETAILED DESCRIPTION

Figure 1A:
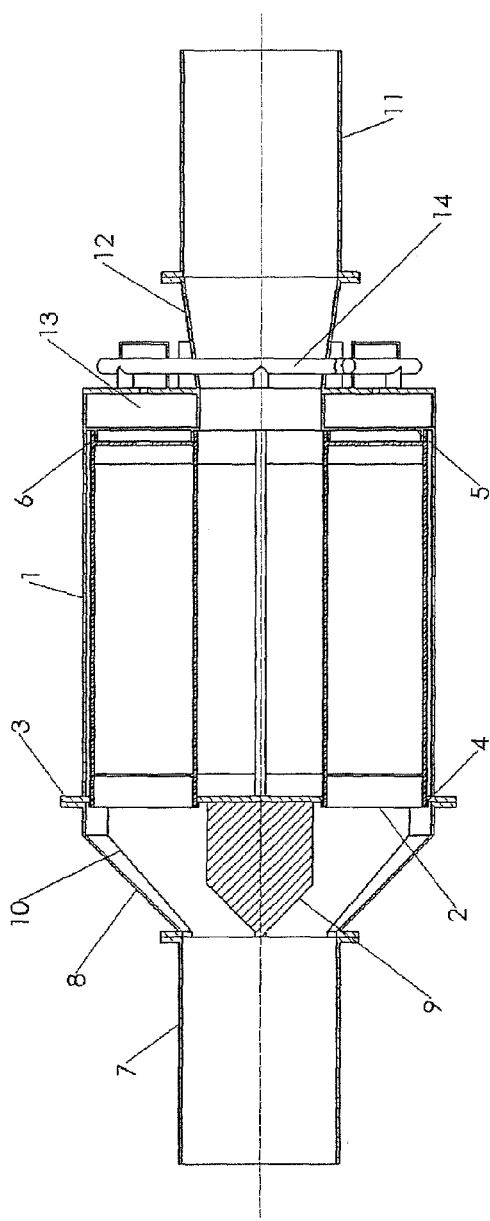

FIG. 1A shows the invention as an in-line filter installation between coaxial horizontal pipes. A vertical configuration or any variation in between is also possible.

The filter arrangement in this embodiment is constructed from the cylindrical filter housing (1) containing multiple filter elements (2) aligned on a pitch circle diameter concentric to the periphery of the cylindrical filter housing. The figure indicates the support at the left hand end (3) with additional fixings (4) and a holder (5), with additional fixings (6) at the right hand that support the filter elements in the correct position.

A horizontal inlet pipe (7) is connected to the cylindrical filter housing by a diverging pipe section (8) that contains a suitable flow guide (9) and additional baffles (10) to gently direct the fluid flow with minimal pressure loss to each of the individual filter elements. In this example the flow guide is cone shaped. Once the fluid has been filtered by the filtering surface of each individual filter element it joins the main bulk of fluid flow and is directed towards the downstream end of the in-line filter.

At the downstream end a horizontal outlet pipe (11) joins a second diverging pipe section (12) to gently reduce the speed of the outgoing fluid flow before continuing into the process line. In this figure, the backwashing mechanism is not shown for clarity, however, a collection chamber (13) used during the backwashing process and the evacuation pipe (14) is highlighted.

FIG. 1B shows an end view from the inlet of the filter arrangement where the suitable guide (9) and baffles (10) can just be seen. FIG. 1A is a cross-section through A-A shown in FIG. 1B.

Figures 1C, 1D:
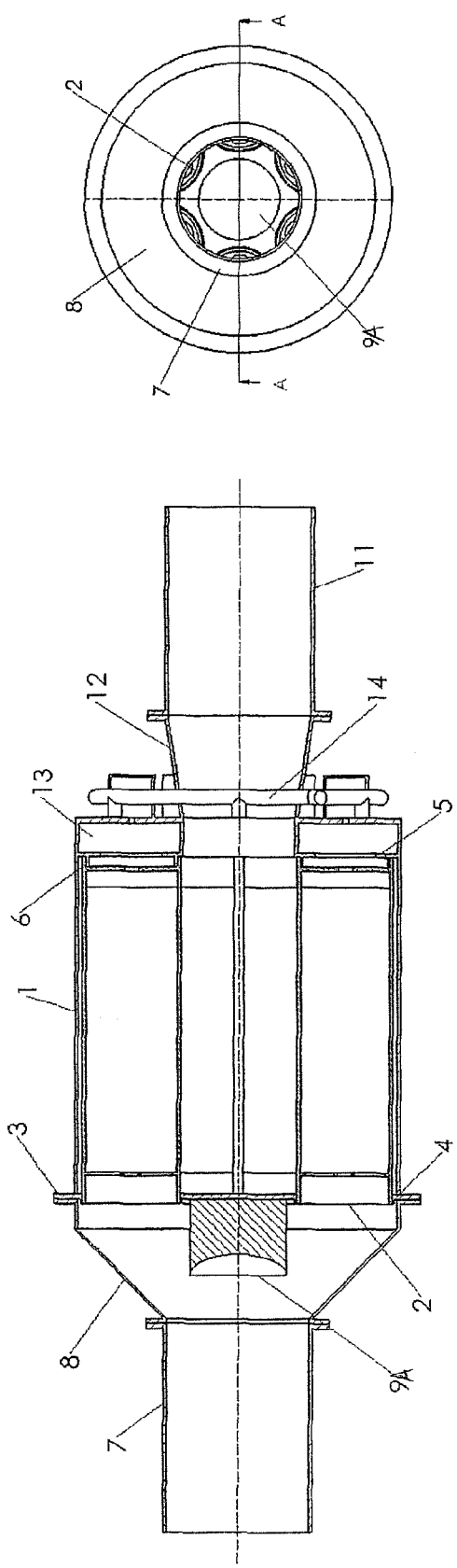
FIGS. 1C & 1D illustrate an alternative in-line filter installation between two horizontal pipes in cross-section and end view respectively.

FIG. 1C shows an alternative arrangement of the in-line filter installation illustrated in FIG. 1A.

In the alternative arrangement the flow guide (9A) is in the shape of a concave hemisphere. This is particularly useful if the diverging pipe section (8) is very short. A short diverging section (8) may be required if space is limited. However using the cone-shaped guide section (9) illustrated in FIG. 1A with a short diverging section can cause problems in directing fluid to the filtration elements because the fluid has to turn very sharply. Using a concave hemispherical shaped flow guide causes the fluid to be slowed down and uniformly spread out resulting in equal amounts entering the filtration elements. The flow guide (9A) does not have to have an exact hemispherical shape as long as the fluid is slowed down and spread out. For example the cross-section of the flow guide can be a segment instead of a semi-circle or any other shape that produces the required effect.

FIG. 1D shows an end view from the inlet of the filter arrangement where the flow guide (9A) can just be seen. FIG. 1C is a cross-section through A-A shown in FIG. 1D.

Figure 1E:
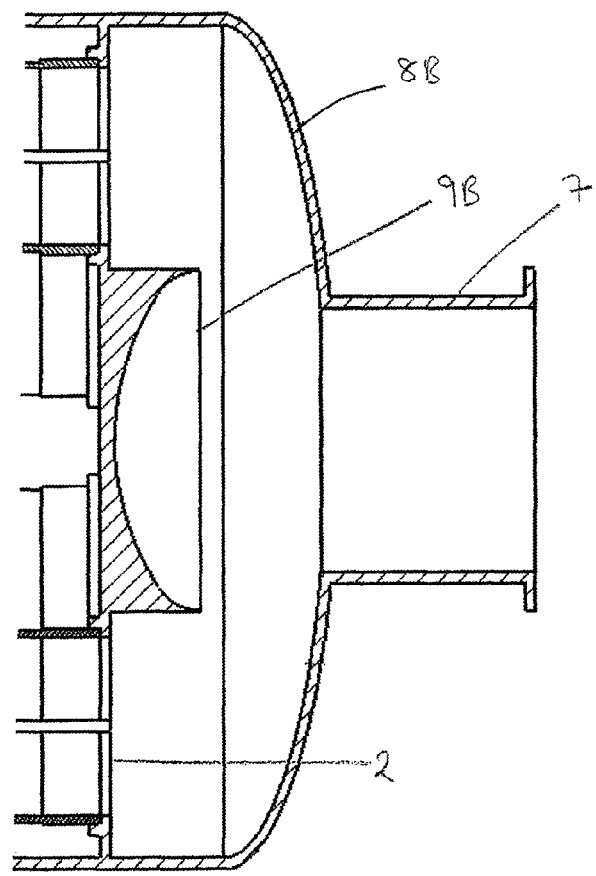
FIG. 1E illustrates an alternative inlet portion for the in-line filter installations in FIGS. 1A to 1D.

FIG. 1E illustrates a third possible arrangement of the inlet of the in-line filter installation illustrated in FIG. 1A. In this arrangement the diverging section (8B) is in the shape of a pressure vessel. This provides a short diverging section to save space. Using the commonly known pressure vessel shape can reduce the cost of manufacture. When the diverging section (8B) is in the shape of a pressure vessel, a hemispherical flow guide (9B) is used to ensure equal amounts of fluid enter the filtration elements as discussed above.

Figure 2:
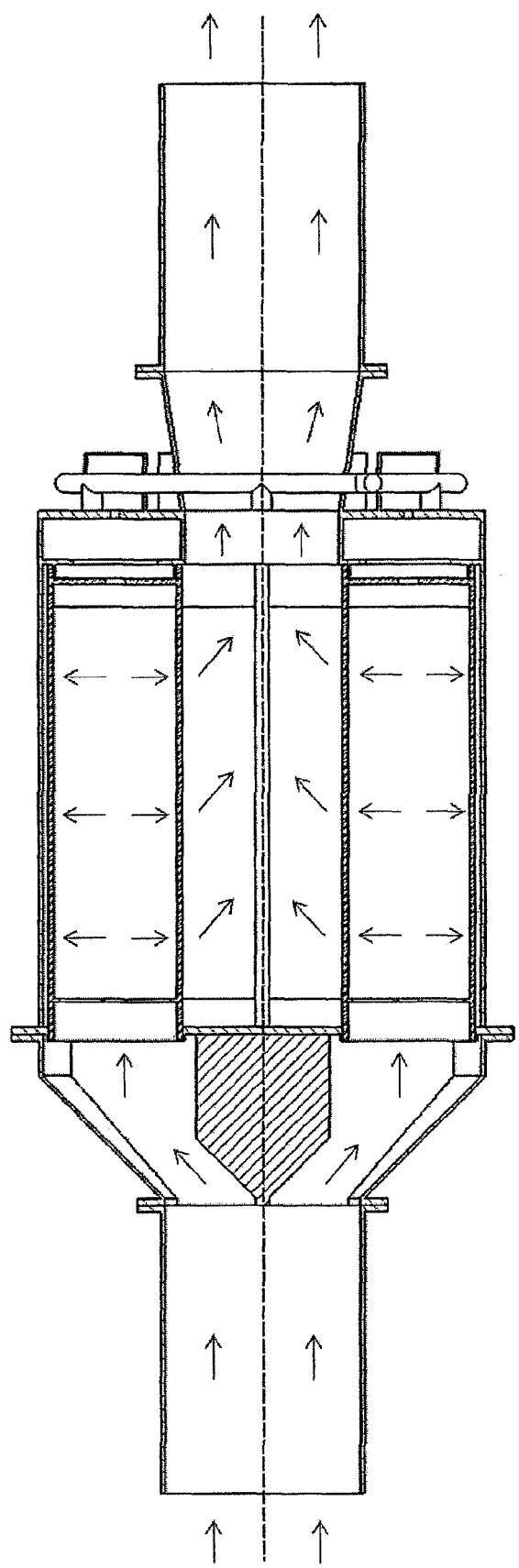
FIG. 2 illustrates the process fluid flow paths into and through the in-line filter installation.

FIG. 2 illustrates the process fluid flow paths into and through the in-line filter installation/arrangement according to the present invention. The arrows indicate the direction of the fluid flow.

As shown fluid flow enters from the left hand end, is directed in equal amounts towards the interior of each of the individual filter elements with minimal pressure loss. The fluid flow then enters the interior of each of the individual filter elements and begins to pass through the filtering surface of each individual filter element. At this point the flow of the fluid is generally perpendicular to the axis of the inlet and outlet to the arrangement.

Once the fluid flow has passed through the filtering surface of each individual filter element it re-joins the main bulk of filtered fluid in the central space of the chamber and is directed towards the downstream end of the in-line filter into the second diverging pipe section and thereafter into the outlet pipe with minimal pressure loss.

Figure 3:
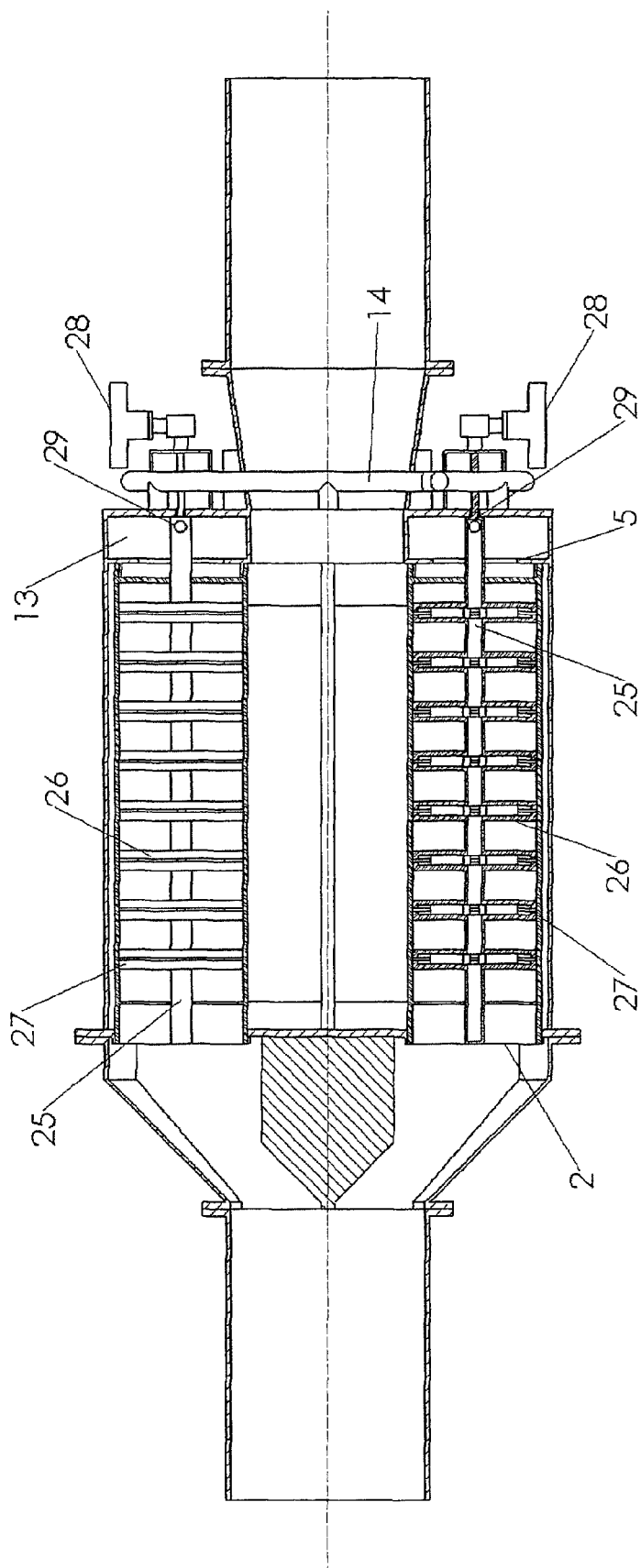
FIG. 3 illustrates the in-line filter installation including a backwashing mechanism according to an invention described herein.

FIG. 3 illustrates the backwashing mechanism according to the invention. The backwashing mechanism has linear movement only which is accomplished by a linear actuator.

The backwashing mechanism is constructed from a central hollow tube (25) that carries a set of specially designed debris receiving portions in the form of disc shaped components (26) that extend outwards from the central hollow tube to the filter element internal surface. The outer periphery of the disc shaped component (26) terminate with a sealing head or arrangement (27), for example spring loaded sealing heads or rubber type seals which compensate for irregularities in the filter element and provides an effective seal between the disc shaped components and the filter element internal surface in order to minimise leakage of unfiltered fluid.

In a spring loaded arrangement the debris receiving portion may be provided with a head formed for example of PTFE or other suitable material capable of maintaining contact with the inner wall of the filter element whilst simultaneously being able to slide axially along the filter element. Such a head may for example be biased against the filter surface using a suitable spring e.g. a coil spring. Thus a seal can be created between the debris receiving portion and the filter element wall and irregularities can be accommodated for. Such as head would of course comprise a slot or channel allow debris to pass into the debris receiving portion.

The disc shaped components (26) include a narrow slot or channel around the entire circumference of the filter element internal surface providing 360 degree coverage. This is described further below. The central hollow tube is driven externally by a linear actuator (28) which provides a linear motion to the backwashing mechanism. The central hollow tube also has an opening (29) into the debris collection chamber (13) which is connected to the evacuation pipe (14). Thus, a conduit is provided between the slot or channel of the components (26) to the evacuation pipe which forms the debris outlet of the filter arrangement.

Figure 4:
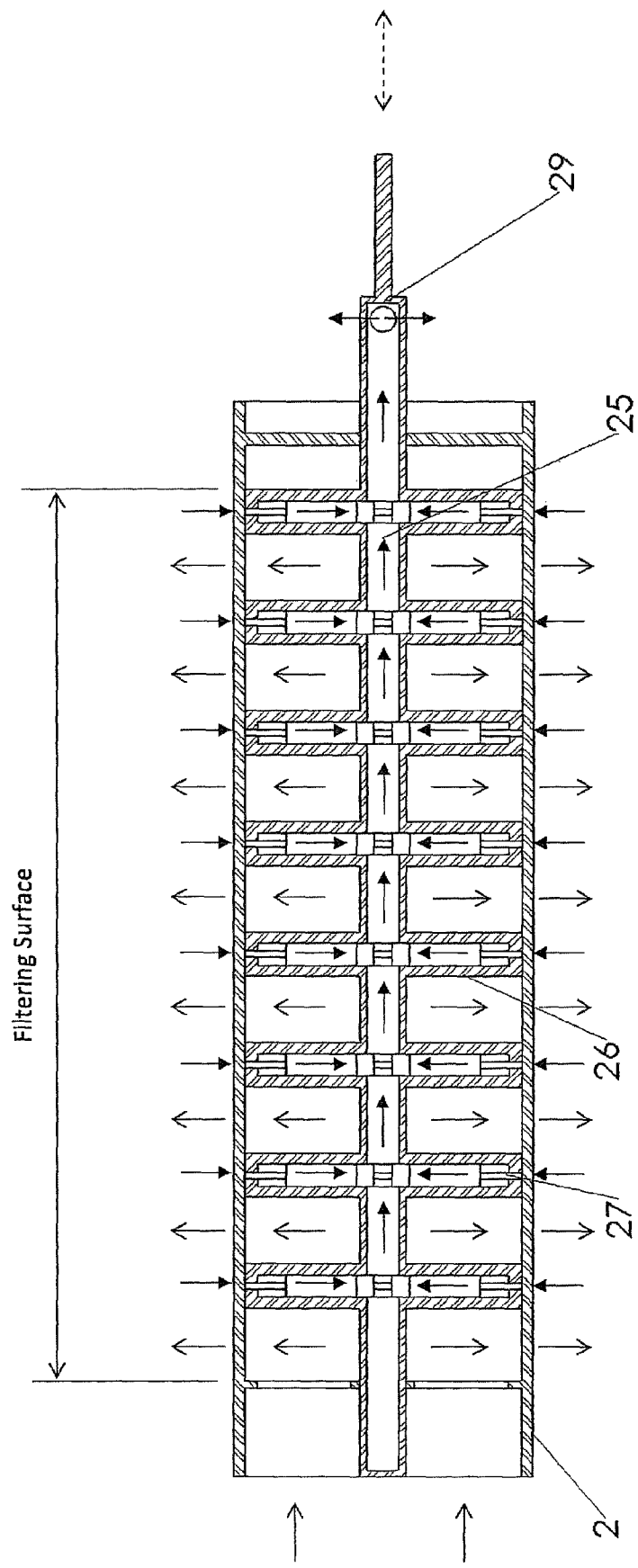
FIG. 4 provides a close up view of the main fluid flow paths in the embodiment of the invention shown in FIG. 3.

FIG. 4 provides detailed view of the fluid flow through an individual filtration element and an associated back-washing mechanism. The open end arrows indicate the direction of the fluid flow under filtration.

Each filtration element comprises a first hollow end (shown on the left hand side of FIG. 4) and a closed end (shown on the right hand side of the element in FIG. 4).

As shown, the fluid flow enters the filter element (2) and begins to pass through the semi permeable filtering surface of the filter element. Once the liquid flow has passed through the filtering surface of the filter element it re-joins the main bulk of fluid flow as described above. The central hollow tube (25) is closed off at the end furthest from the external linear actuator (at the left hand side of FIG. 4) but is open at its opposite end (29). Thus a path or conduit is provided. The opposite end of the central hollow tube terminates in the debris collection chamber underneath the filter element where part of the central hollow tube is connected to the external linear actuator and a part of the central hollow tube remains open to the debris collection chamber. When cleaning is required a valve can be opened on the evacuation pipe and the liquid fluid flows from the outer filter element surface, backwashes the cake of matter into the narrow circumferential slot or channel (27) of the debris receiving portion or disc (26), along the central hollow tube (25) to the opening (29) to a debris collection chamber where it can then be further evacuated out through evacuation pipes. The flow of the backwashing fluid is shown with filled in arrows. Thus, open ended arrows indicate forward flow of process fluid and filled arrows indicate reverse of backwashing flow. Also in the figure, the linear actuation of the backwashing mechanism is noted.

Figures 5A, 5B:
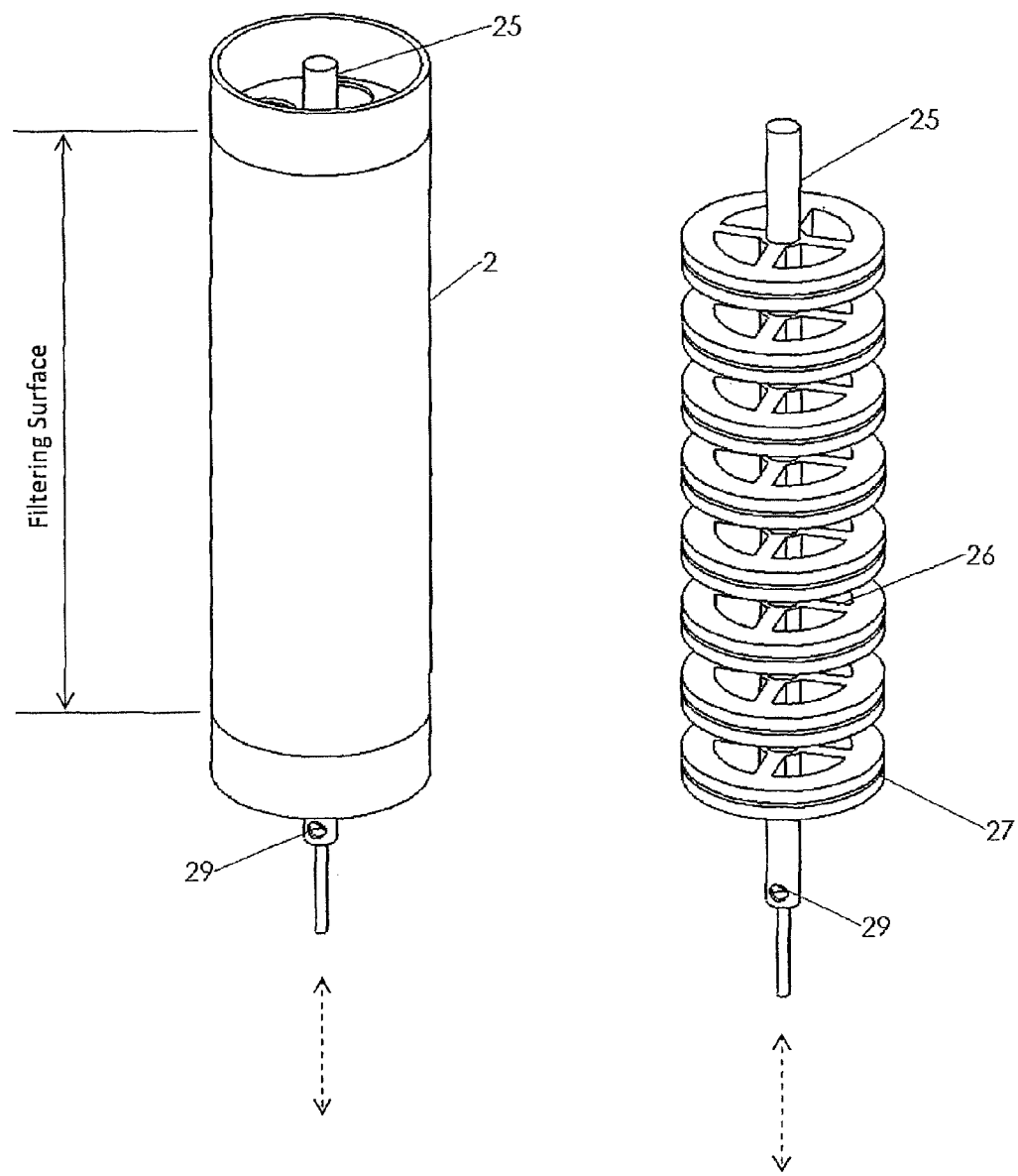
FIGS. 5A and 5B provide alternative views of the embodiment of the invention shown in FIG. 4.

FIGS. 5A and 5B are alternative views of the filter element shown in cross-section in FIG. 4. FIG. 5B illustrates the back-washing mechanism support structure and plurality of debris receiving portions equally spaced along the length thereof. As shown the debris receiving portions are formed of rings or discs coupled to a hollow central shaft by a plurality of spokes or support arms. In FIG. 5B 4 spokes per disc are shown. It will be recognised that any suitable number or shape of debris receiving portion may be used. The portions may for example be angled or profiled to facilitate fluid flow.

The central hollow tube (25) is show on to which is installed a plurality of the disc shaped components (26) that extend radially outwards from the central hollow tube to the filter element internal surface. A seal (27) is provided as described further below.

The disc shaped components include a narrow slot around the entire circumference of the filter element internal surface providing 360 degree coverage. The shape and configuration of the debris receiving portion and the slot is adapted depending on the shape of the particular filter elements forming the filter arrangement.

For example, for a circular cross-section a 360 degree coverage area of the slot is required because the filtration area extends around 360 degrees. In an arrangement comprising square filter elements the debris receiving portion is also square in cross-section and may then be provided with a slot on each side of the square. In such an arrangement the corners of the square may act as support regions as opposed to filtration regions and thus there is no need for the slot to extend over these regions. Hence the slot is adapted so as to extend over the entire filtration area of the filter at a given cross-section. This ensures that the entire filtration surface of the filter element is cleaned on axial movement of the debris receiving portions without unnecessarily cleaning non-filtration regions.

In effect the debris receiving portion is provided with a slot (or plurality of holes through which the debris can pass) which is adapted so that it corresponds to the filtration area and to the cross-section of the filter element wall.

The central hollow tube (25) is closed off at the end furthest from the external linear actuator but is open at its opposite end (29). This defines the debris discharge or evacuation outlet.

The spokes extending between the disc shaped components are hollowed out in such a way as to provide a path for the back-washing fluid to reach the central hollow tube.

The spoke arrangement also allows the unfiltered process fluid to enter and conveniently travel along the length of the hollow filter element.

Although shown exaggerated in the figures the disc portions are selected so as to be a thin as possible whilst maintaining the required structural strength for the application. Thus, the area of the filtration wall covered by the periphery of the discs at any time is minimised thereby maximising filtration area.

FIG. 5A illustrates the back-washing mechanism inserted into a hollow elongate to filter element (2). As shown in FIG. 5A the open end (29) of the back-washing mechanism i.e. the port through which the debris is removed from the assembly can be seen extending from the distal or lower end of the filter element. This end of the filter element corresponds to the closed end of the filter. The upper end of the element as see from FIG. 5B corresponding to the open end of the element.

Figure 6A:
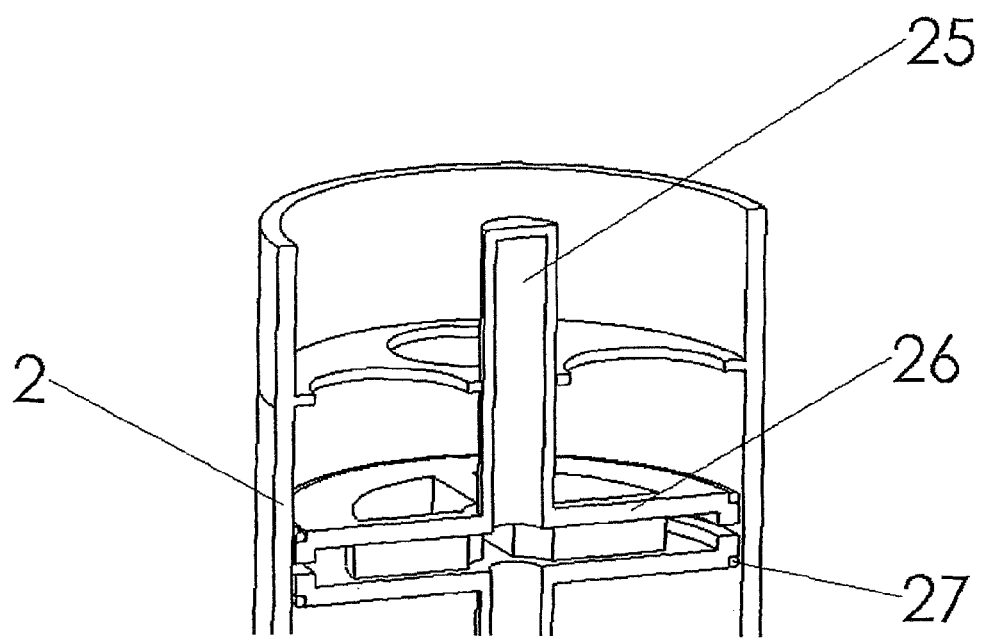
FIG. 6A provides as section and internal view of the disc shaped components showing the connection to the central hollow tube, the narrow 360 degree circumferential slot and sealing arrangement.

FIG. 6A provides a cross-section through the filter arrangement and back-washing mechanism shown in FIG. 5B. The portion of the filter arrangement and mechanism shown in FIG. 6A corresponds to the upper end of FIG. 5B and illustrates the open end of the filter element into which process fluid is communicated and the closed end of the central hollow tube (25).

Figure 6B:
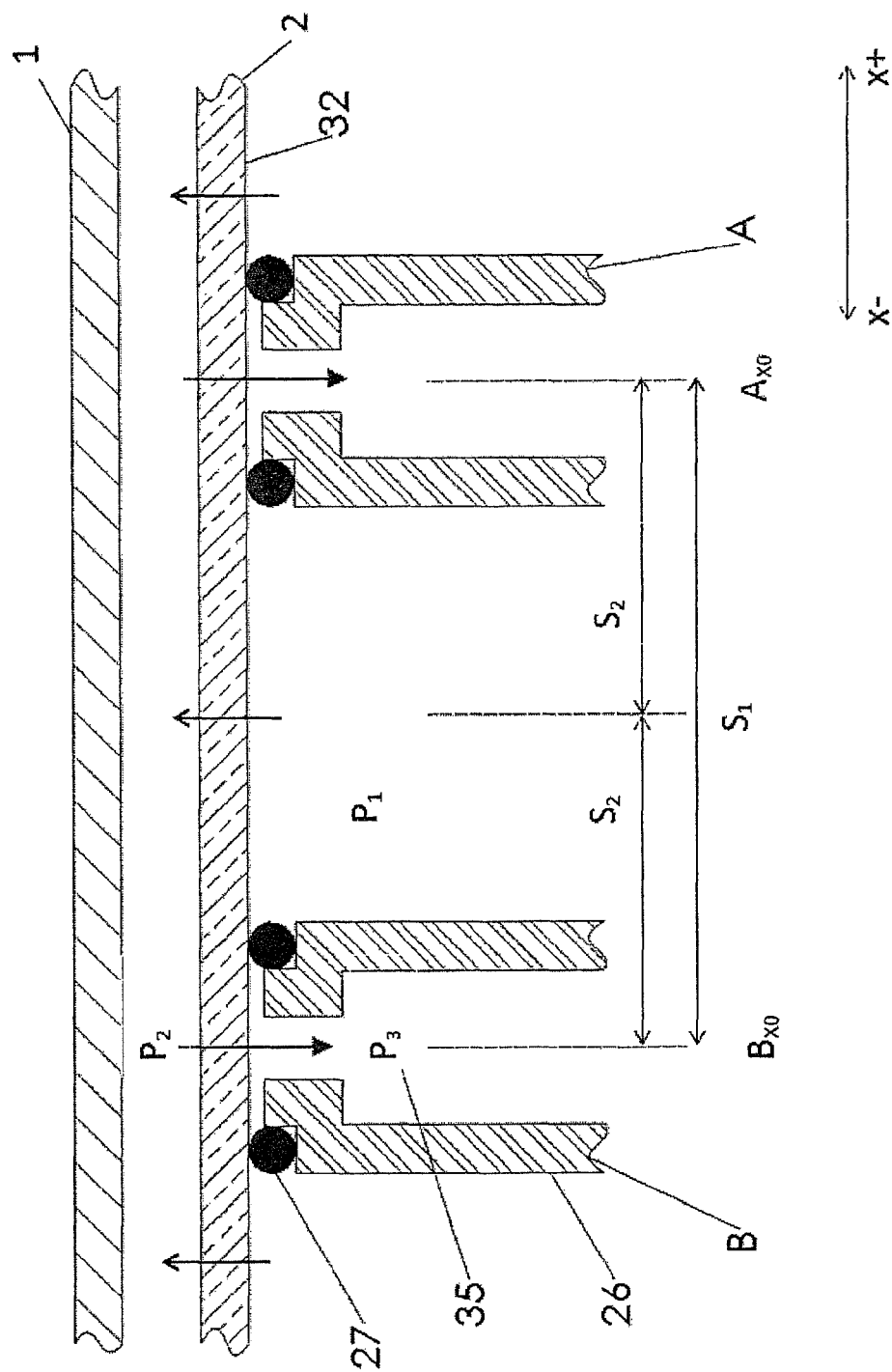
FIG. 6B illustrates the sealing arrangement, process fluid flow and movement of the back-washing mechanism according to an invention described herein.

As shown in FIG. 6A and FIG. 6B the disc shaped components (26) extend from the hollow centrally located tube (25) to the filtration element wall inner surface (32). A narrow 360 degree circumferential slot (33) is provided so as to be immediately adjacent to the filtration wall. A seal (27) is provided on either side of the disc shaped component (26) to prevent process fluid within the hollow portion of the filter element passing directly into the hollow tube (25). FIG. 6A also illustrates a support plate (34) supporting the hollow central tube (25).

FIG. 6B shows a close up cross-section of the debris receiving portion and filtration wall.

FIG. 6B shows the disc shaped components (26) defining the debris receiving portion, the filtration wall (2) and the outer housing of the filter arrangement (1). The component (26) extends so that its periphery is immediately adjacent to the filtration wall inner surface (32) and is provided with an O ring seal (27) on either side to provide a seal between the hollow space of the filtration element and the central channel (35) or the portion (26).

The central channel (35) comprises a narrow portion proximate the filtration wall and a wider portion communicating with the hollow tube (25). This is illustrated in FIG. 10A. Also shown in FIG. 6B is the pitch spacing $S_1$ of adjacent portions (26) and the half pitch movement of the portions as described below $S_2$.

In use the filter functions as follows.

Process fluid flows into the central portions of the hollow elongate filter elements through the holes in the support plate (34) shown for example in FIG. 6A. Referring again to FIG. 6B in a normal mode of operation i.e. non-back-washing mode process fluid flows as shown by the un-filled arrows. That is the fluid flows from the inside of the hollow filter element through the filter wall and into the cavity defined between the outside of the element and the chamber housing (1).

The flow of process fluid is driven by the different in pressure between $P_1$ and $P_2$. $P_1$ being the pressure within the hollow filter element and $P_2$ being the pressure outside of the hollow filter element. The pressure within the channel (35) of the portion (26) is maintained at a pressure greater than or equal to the pressure on the outside of the filter element i.e.:

$$P_3 => P_2$$

The O ring seals (27) prevent unfiltered fluid flow into the channel (35) and process fluid is directed through the semi-permeable filter wall and to the outlet of the assembly having had impurities removed and retained by the filter wall in the form of debris or a 'cake'.

To effect a back-washing cycle the pressure within the channel is reduced so as to be less than the pressure on the outside of the filter element i.e.:

$$P_3 <= P_2$$

This reduction in pressure may for example be achieved by drawing a vacuum or applying suction to the debris outlet port (29) described above.

Back-washing fluid flow is illustrated by the filled in arrows. As shown filtered process fluid on the outside of the hollow filter element is caused to flow in a reverse direction through the filter element wall so as to convey debris of cake situated on the inner surface (32) of the filter into the channel (35). Again the O ring seals (27) prevent ingress of un-filtered process liquid directly into the chamber. This mini-mises the volume of liquid drawn out of the filter arrange-ment during the back-washing cycle.

The movement of the back-washing mechanism will now be described. As shown in FIG. 6B adjacent components (26) are separated by a spacing pitch $S_1$. $S_2$ indicates half of that pitch and illustrates the limit of movement in a first and second linear direction of each component (26).

To effect the back-washing cycle first, the pressure is reduced in the channel by means of a control valve being opened to connect the debris outlet (29) to the plurality of channels via the hollow tube (25). If the difference between atmospheric pressure and $P_2$ is great enough additional suction is not required. If the pressure difference is not great enough additional suction may be applied such that the condition $P_3 <= P_2$ is satisfied. Both conditions can reverse flow of process fluid and fluid begins to flow into the channel (35) carrying debris from the filter wall into the channel and out of the debris outlet (29).

Simultaneously a linear actuator is activated to each or individual back-washing mechanisms to cause a linear movement of the back-washing mechanism(s). Because the plurality of components (26) are integrally coupled to the hollow tube all of the components move synchronously axially along the respective filter element.

The linear actuator is arranged to move the backwashing mechanism reciprocally by a distance of $S_2$ is a first direction $x^+$ and by a distance of $S_2$ in an opposing direction $x^-$. This is illustrated in FIG. 6B where the component A is moved from origin $Ax_0$ by distance $S_2$ in direction $x^-$ and then returned to origin $Ax_0$. Similarly as component A moves so too does component B and as A moves in direction $x^+$ component B moves by distance $S_2$ in the same direction.

Each disc shaped component extends around the entire inner circumference of the hollow filter element. As described above, depending on the shape of the filter ele-ment the debris receiving portion and debris receiving channel will be adapted accordingly.

Thus, the combined effect with the linear movement is that by movement of the back-washing mechanism by half the component pitch $S_1$ in each direction the entire surface of the hollow element can be cleaned with minimal time and thus minimal process fluid use.

Figure 7:
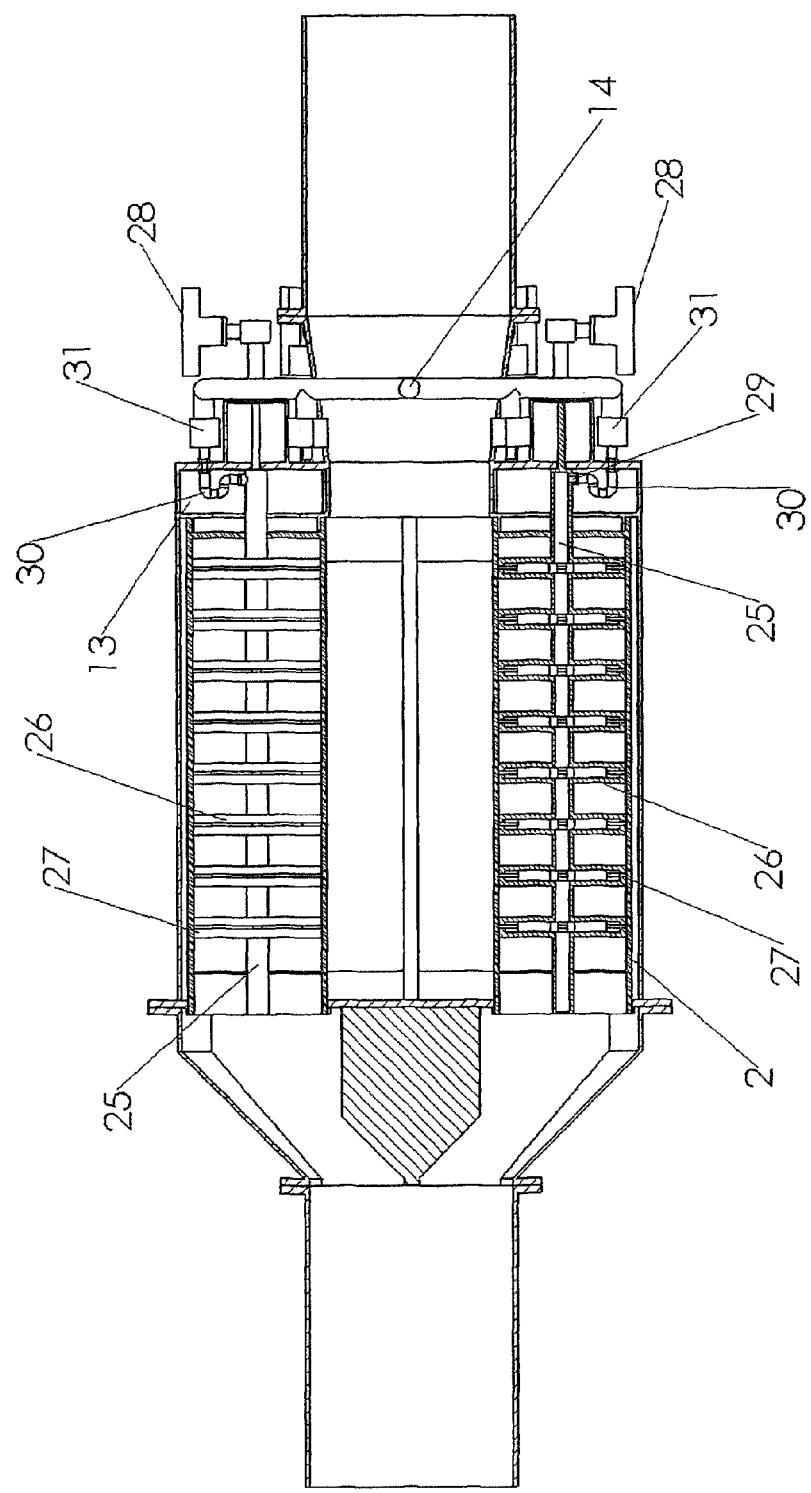
FIG. 7 provides an alternative way of connecting the evacuation pipe to each backwashing mechanism in order to increase the efficiency of the backwashing mechanism by reducing pressure losses.

FIG. 7 shows an alternative way of connecting the debris removal outlet or evacuation pipe to each back-washing mechanism in order to increase the efficiency of the back-washing mechanism by reducing pressure losses.

As shown in FIG. 7 a flexible pipe (30) is connected directly from the opening in the central tube (29) to the evacuation pipes (14) thereby bypassing and removing the need for a debris collection chamber and reducing the pressure losses. The flow of the backwashing cake of matter may now pass out of the filter in a more efficient way as there are fewer restrictions in its path. In addition, a dedicated solenoid valve (31) for each backwashing mechanism is shown so that each backwashing mechanism may be acti-vated independently and have no effect on another.

Figure 8A:
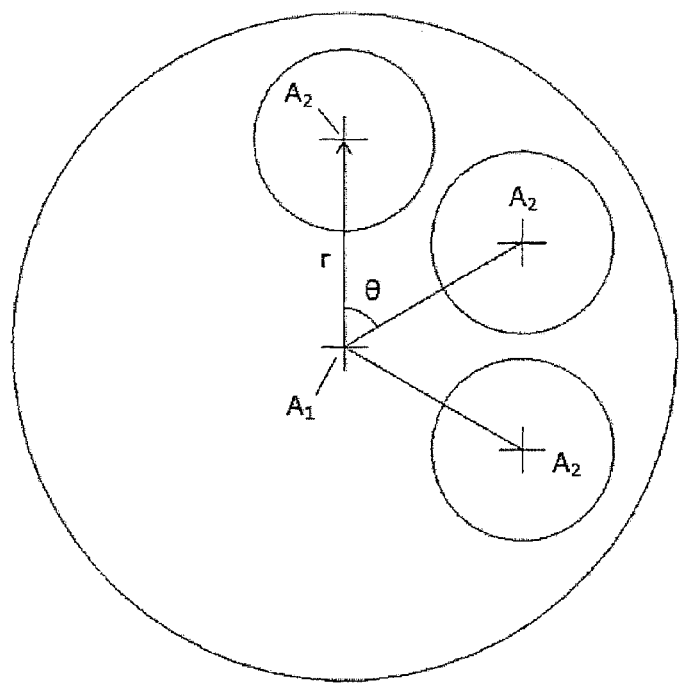
FIGS. 8A and 8B illustrate a further end and cross-section view of the in-line filter assembly according to an invention described herein.
Figure 8B:
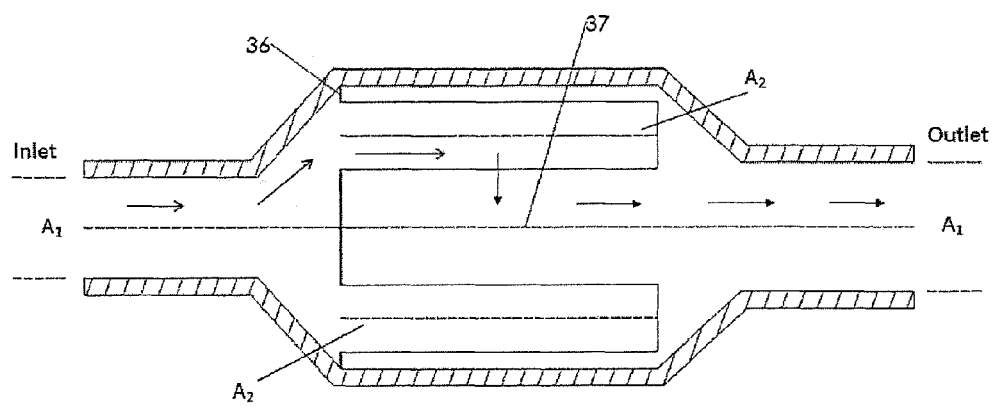

FIG. 8A shows an end view as seen from the inlet to the filter arrangement. The inlet axis $A_1$ is shown in the centre of the filter arrangement with a plurality of radially and circumferentially located hollow filter elements each located at a radius r and at an angle theta (ø). Only three elements are shown each with an axis $A_2$ FIG. 8B shows a cross-section through the filter arrange-ment again illustrating the axis $A_1$ which, as shown, is coaxial with the outlet on the right hand side of the FIG. 8B. Each of the filter elements has an axis $A_2$ which, as shown, is parallel to, but radially spaced from, the axis $A_1$.

Unfiltered process fluid is shown by the un-filled arrows and filtered process fluid by the filled in arrows. As shown in FIG. 8B un-filtered fluid enters the filter arrangement along axis A1 and then diverges entering each of the hollow filter elements along axes $A_2$. The closed plate (36) ensures fluid does not flow directly along the axis of the filter arrangement. Fluid passes through the filter wall in a radial direction and then changes direction to re-align with the axis $A_1$. Filtered fluid is then communicated to the outlet shown on the right hand side of FIG. 8B. As shown the unfiltered inlet fluid and filtered outlet fluid have a common and coaxial axis. The central region (37) shown in FIG. 8B is conventionally filled with additional filter elements so as to maximise the filtration areas within a given chamber. The inventors has advantageously discovered that sacrificing this area in favour of a centrally located fluid collection and alignment chamber provides surprisingly and significant advantages in terms of overall performance of the filter arrangement. An equal amount of fluid can be easily and gently directed to each filter element as described above which, in turn, advantageously reduces pressure loss.

Thus, according to the inventions described herein there is provided an inline filter arrangement having minimal pressure loss and requiring minimal pressure head to func-tion by virtue of the coaxial nature of the inlet and outlet and internal arrangement of filter elements. Additionally a backwashing mechanism may be provided which can be used in isolation with a conventional filter assembly or synergistically with the in-line filter arrangement enclosed to provide a further enhanced filter arrangement.

It will be recognised with the benefit of the teaching of the present application that features of either aspect of inventions described herein may be conveniently used in any suitable combinations.

CLAUSES

1. A filter arrangement comprising a coaxial inlet and outlet and a plurality of hollow filter elements, wherein each of said hollow filter elements is spaced radially and circumferentially with respect to the axis of the inlet and outlet and are arranged to extend parallel to said axis, and wherein each of said hollow filter elements is arranged to communicate fluid from an inside to an outside thereof via a semi-permeable filtration wall.
2. A filter arrangement according to clause 1, wherein the flow path of fluid passing through the arrangement is such that changes in direction of fluid from the axis defined by the inlet and outlet are arranged to take place within a housing of the arrangement.
3. A fluid treatment system comprising a filter assembly according to any preceding clause.
4. A ballast water treatment system comprising a filter arrangement or method according to any preceding clause.

The invention claimed is:

1. A filter arrangement, comprising:
   a chamber and a plurality of elongate hollow filtration elements contained therein, each element comprising a semi-permeable filtration wall and an internally located back-washing mechanism; and
   an inlet for unfiltered fluid and an outlet for filtered fluid; wherein:
   each back-washing mechanism comprises at least one debris receiving portion having a cross-section corresponding to the cross-section of the hollow filtration element such that the outer perimeter of the debris receiving portion is located immediately adjacent to the inner periphery of the filtration wall of the hollow element;
   wherein each backwashing mechanism is adapted to allow movement of the debris receiving portion(s) along at least part of the length of the respective filtration element
   the chamber is generally cylindrical and the plurality of hollow filtration elements are arranged parallel to the elongate axis of the cylindrical chamber;
   the inlet for unfiltered fluid and the outlet for filtered fluid have a common and coaxial axis that is the elongate axis of the cylindrical chamber;
   the plurality of hollow filtration elements are equally spaced within and around the periphery of the cylindrical chamber and define a centrally located space having a radius measured radially from the central elongate axis wherein the centrally located space is configured to receive filtered process fluid from the outer surfaces of the filtration elements and is fluidly connected to the outlet of the filter arrangement; and
   the radius of said centrally located space is equal to or less than the radius of the outlet for filtered fluid.

2. A filter arrangement as claimed in claim 1, wherein the filtration element and debris receiving portions both have a circular cross-section such that the outer periphery of the debris receiving portion is located immediately adjacent to the inner surface of the filtration element.

3. A filter arrangement as claimed in claim 2, wherein the debris receiving portions are in the form of discs and the filtration elements are in the form of hollow cylinders.

4. A filter arrangement as claimed in claim 1, wherein each filtration element comprises a first open end arranged to receive fluid from an inlet to the filter arrangement and a second closed end, such that fluid entering the filtration element is directed through the semi-permeable filtration wall.

5. A filter arrangement as claimed in claim 1, wherein the debris receiving portion(s) is/are arranged on a shaft coaxially located with respect to the filtration element and movable along an elongate axis of the shaft.

6. A filter arrangement as claimed in claim 5, wherein the back-washing mechanism is arranged to move reciprocally along the length of the filtration element by a distance, in each opposing direction, equal to half of the axial spacing of adjacent debris receiving portions.

7. A filter arrangement as claimed in claim 1, wherein each back-washing mechanism comprises a plurality of debris receiving portions equally spaced along the length of the respective filtration member.

8. A filter arrangement as claimed in claim 1, wherein a given back-washing mechanism comprises a plurality of debris receiving portions, and
   wherein each debris receiving portion comprises a peripherally extending channel arranged to receive debris from the filtration wall and at least one conduit arranged to communicate debris from the respective channel to a debris outlet of said filter arrangement.

9. A filter arrangement as claimed in claim 8, wherein the at least one conduit extends from the peripherally extending channel of each of the debris receiving portions to a centrally located conduit extending along the length of the given back washing mechanism.

10. A filter arrangement as claimed in claim 9, further comprising a control valve arranged to selectively open and close the debris outlet.

11. A filter arrangement as claimed in claim 10, further comprising a suction apparatus coupled to said debris outlet.

12. A filter arrangement as claimed in claim 8, further comprising a drive mechanism arranged to linearly and reciprocally move the given back-washing mechanism along the axis of the filtration element.

13. A filter arrangement as claimed in claim 1, further comprising a flow guide arranged between the inlet to the filter arrangement and the hollow filtration elements and arranged in use to direct fluid from the filter arrangement inlet to an open end of each hollow filtration element.

14. A filter arrangement as claimed in claim 13 wherein the flow guide is cone-shaped or in the shape of a concave hemisphere.

15. A filter arrangement as claimed in claim 13 wherein the flow guide comprises a recessed portion opposing and in alignment with the inlet.

16. A filter arrangement as claimed in claim 13, wherein the flow guide further comprises a baffle plate.

17. A filter arrangement as claimed in claim 13, wherein the diameter of the chamber is greater than the diameter of the filter arrangement inlet and wherein the filter arrangement further comprises a divergent portion diverging from the diameter of the inlet to the diameter of the chamber and arranged to communicate fluid there between.

18. A filter arrangement as claimed in claim 1, further comprising a diverging portion arranged between said centrally located space and said outlet and arranged to communicate fluid there between.

19. A filter arrangement as claimed in claim 1, wherein the debris receiving portions are provided with seals arranged to provide a seal between the outer perimeter of the portion and the inner wall of the filter element.

20. A filter arrangement as claimed in claim 19, wherein the seal is a pair of O ring seals.

21. A filter arrangement as claimed in claim 19, wherein the seal is arranged to be biased against the inner wall of the filter member.

22. A filter arrangement as claimed in claim 1, wherein the plurality of debris receiving portions are arranged to move only linearly in a first direction and linearly and simultaneously rotationally in a second return direction.

23. A method of back-washing a filter arrangement, comprising:
(A) providing a filter comprising:
a chamber and a plurality of elongate hollow filtration elements contained therein, each element comprising a semi-permeable filtration wall and an internally located back-washing mechanism; and
an inlet for unfiltered fluid and an outlet for filtered fluid; wherein:
each back-washing mechanism comprises at least one debris receiving portion having a cross-section corresponding to the cross-section of the hollow filtration element such that the outer perimeter of the debris receiving portion is located immediately adjacent to the inner periphery of the filtration wall of the hollow element wherein each backwashing mechanism is adapted to allow movement of the debris receiving portion(s) along at least part of the length of the respective filtration element;
the chamber is generally cylindrical and the plurality of hollow filtration elements are arranged parallel to the elongate axis of the cylindrical chamber;
the inlet for unfiltered fluid and the outlet for filtered fluid have a common and coaxial axis that is the elongate axis of the cylindrical chamber;
the plurality of hollow filtration elements are equally spaced within and around the periphery of the cylindrical chamber and define a centrally located space having a radius measured radially from the central elongate axis wherein the centrally located space is configured to receive filtered process fluid from the outer surfaces of the filtration elements and is fluidly connected to the outlet of the filter arrangement; and
the radius of said centrally located space is equal to or less than the radius of the outlet for filtered fluid;
(B) creating a pressure differential between the chamber and a debris receiving portion such that fluid is caused to flow in a reverse direction through the filtration wall; and
(C) moving the debris receiving portion(s) relative to the filtration wall so as to remove debris from the filtration wall.

24. A fluid treatment system comprising a filter arrangement, the filter arrangement comprising:
a chamber and a plurality of elongate hollow filtration elements contained therein, each element comprising a semi-permeable filtration wall and an internally located back-washing mechanism; and
an inlet for unfiltered fluid and an outlet for filtered fluid; wherein:
each back-washing mechanism comprises at least one debris receiving portion having a cross-section corresponding to the cross-section of the hollow filtration element such that the outer perimeter of the debris receiving portion is located immediately adjacent to the inner periphery of the filtration wall of the hollow element wherein each backwashing mechanism is adapted to allow movement of the debris receiving portion(s) along at least part of the length of the respective filtration element;
the chamber is generally cylindrical and the plurality of hollow filtration elements are arranged parallel to the elongate axis of the cylindrical chamber;
the inlet for unfiltered fluid and the outlet for filtered fluid have a common and coaxial axis that is the elongate axis of the cylindrical chamber;
the plurality of hollow filtration elements are equally spaced within and around the periphery of the cylindrical chamber and define a centrally located space having a radius measured radially from the central elongate axis wherein the centrally located space is configured to receive filtered process fluid from the outer surfaces of the filtration elements and is fluidly connected to the outlet of the filter arrangement; and
the radius of said centrally located space is equal to or less than the radius of the outlet for filtered fluid.

* * * * *